INVENTOR.
WILLIAM H. SWAIN

United States Patent Office 3,369,154
Patented Feb. 13, 1968

3,369,154
OVERLOAD PROTECTOR FOR ELECTRICAL CURRENT SUPPLY INCLUDING A SOLID STATE BREAKER WITH IMPROVED SEQUENCING LOGIC COMBINED WITH OR WITHOUT A COMBINED ELECTROMECHANICAL BREAKER
William H. Swain, 4662 Gleason Ave., Sarasota, Fla. 33581
Filed Aug. 3, 1965, Ser. No. 476,861
5 Claims. (Cl. 317—22)

ABSTRACT OF THE DISCLOSURE

Previously described overcurrent protectors using silicon controlled rectifiers (SCR) are improved by the structure of the present application in the following ways:

(1) Normal faults are interrupted by the SCR's, but unexpectedly severe faults are momentarily interrupted by an electromechanical breaker. This permits the use of lower cost SCR's and commutating capacitors and improves overall reliability under severe service conditions.

(2) Provision is made for fully energizing the load turn-off commutating capacitor before the load is re-energized automatically after a circuit interruption. A second timing network and a Reset SCR are used.

The object of this invention is to provide reliable and economic overcurrent protection for silicon controlled rectifier power handling electrical circuits which will operate even under the most severe overload conditions, and a protector which is capable of automatic reset and rapidly repeated operation.

While the protector of the present invention may be, for economic reasons designed for the usual circuit fault, where the rate of rise of fault current is known within reason, the invention also comprehends the inclusion of a back-up circuit breaker which supplements the protector action and will accommodate those faults that are most unusual and unexpected, and much more severe. Silicon controlled rectifiers are more difficult to turn off the higher the electrical current to which they are subjected and this can result in very large components if a very fast and large fault current occurs in rare cases and the employment of the back-up circuit breaker will provide for this contingency and prevent disaster in the circuit.

Figure 1:
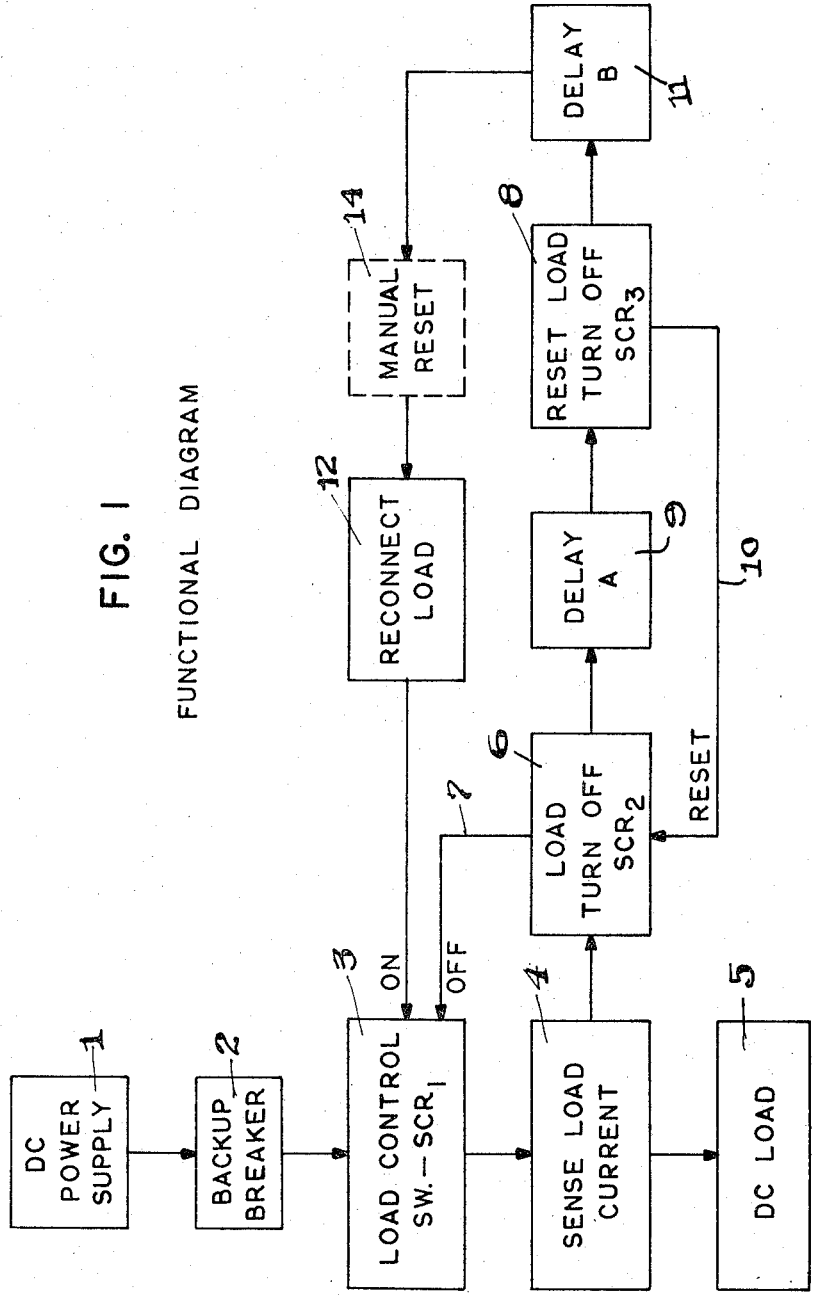
FIGURE 1 is a block functional diagram of the improved overload protector.

Referring more particularly to the drawings, and in particular FIGURE 1 thereof.

The block diagram, FIGURE 1, shows the basic functioning of the protector, and shows the electrical circuit including the D.C. power supply 1 connected through the back-up circuit breaker 2 to the load control silicon controlled rectifier 3, through a current load sense device 4 to the load indicated at 5. The load current sensor or resistor 4 is connected to a load turn off silicon controlled rectifier 6, which is connected as shown at 7 to the load control silicon controlled rectifier 1 and also to a reset load turn off silicon controlled rectifier 8 through a time delay apparatus 9.

The reset load turn off silicon rectifier 8 is connected through reset connection 10 to the load turn off silicon controlled rectifier 6 and through a delay device 11 and a reconnect load apparatus 12 to the "on" contact of the load control silicon rectifier 3. A manual reset device 14 (shown in dotted lines) may be connected in the circuit between the delay 11 and the reconnect load device 12.

FIGURE 1 shows the basic functioning of the protector. If the load current exceeds the set value this is sensed by the load current sensor 4 and used to fire the load turn off silicon controlled rectifier 6 which is connected in the circuit in such manner that it will turn off the load control or load current carrying silicon controlled rectifier 3. The excessive load current is thereby interrupted promptly. The load fault may be permanent, or of only short duration, or of the sort that is removed if the power is interrupted for a brief interval of time. Then it is usually desired to retry closing the load onto the main power after a short shut down time. However, this should not be done until prompt protection is available, since if the fault is still there, destructive currents may flow on the second try. The remainder of the circuit provides these functions.

The signal due to the turning off of the silicon controlled rectifier 3 by the silicon controlled rectifier 6 is retarded by the delay 9 and then used to reset the silicon controlled rectifier 6 by turning off its anode current. This is done by the silicon controlled rectifier 8. Time is required after the silicon controlled rectifier 6 is turned off before the silicon controlled rectifier 3 turn off circuit is recharged with the energy needed if another fault is detected. This time is provided by the delay 11. At the end of the delay provided by delay apparatus 11 the load carrying silicon controlled rectifier 3 is fired. If the load current is then within the ratings prescribed the circuit is restored to normal operation. Should the load still be excessive, the protector fires again, and drops the load. The delays can be made long enough so that heating is not excessive even if the fault persist and many breaking operations occur.

Summing up, the cycling is: sense overload, turn off silicon controlled rectifier 3 by firing silicon controlled rectifier 6. Wait delay seconds provided by delay apparatus 9 until the silicon controlled rectifier 3 turn off is cleared, turn off silicon controlled rectifier 6 by firing silicon controlled rectifier 8, wait delay provided by delay apparatus 11 to be sure the silicon controlled rectifier 6 circuit is fully reset and able again to turn off the load control silicon controlled rectifier 3 and then refire silicon controlled rectifier 3.

Figure 2:
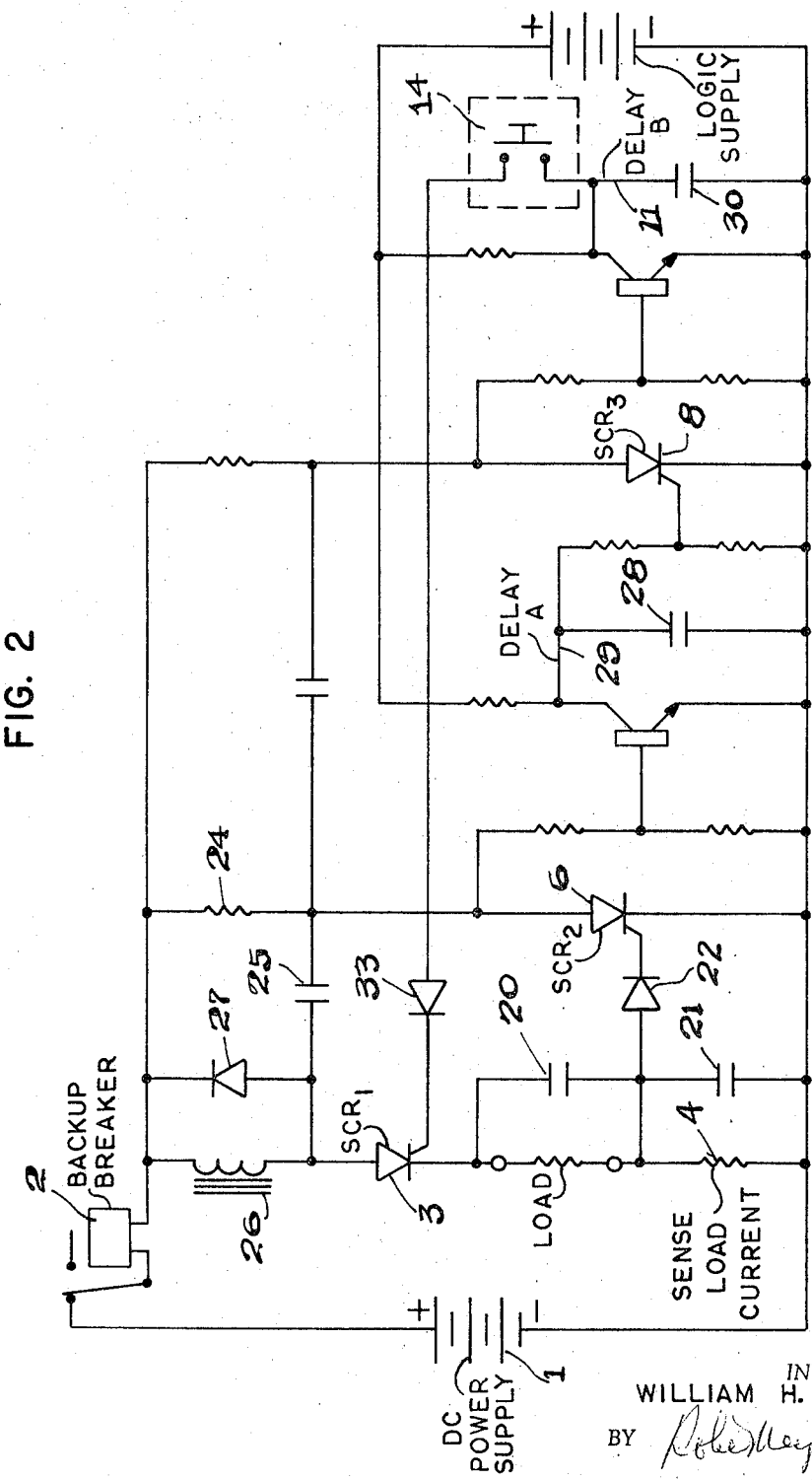
FIGURE 2 is a schematic diagram of the overload protector.

The schematic diagram of a small unit used to demonstrate the value of this approach is shown in FIGURE 2 of the drawings. A larger installation may add several more circuits to be sure that each step is completed before proceeding to the next.

When load voltage is applied capacitor 20 charges to at least a part of the supply voltage. This assists in turning off the load control silicon controlled rectifier 3 if necessary. It also stabilizes the load current during the cycling operation. Excessive load current is sensed in the low valued resistor 4. A modest capacitor 21 is connected across this to prevent very short spike currents from operating the breaker. An overcurrent produces enough voltage in the sensing resistor 4 to override the gap voltage of the diode 22 and gate current flows to the silicon controlled rectifier 6. The resulting anode current in the silicon controlled rectifier 6 produces a sharp negative voltage across the resistor 24. This is transmitted through the commutating capacitor 25 to the commutating inductor 26 and the anode of the load carrying silicon controlled rectifier 3. Since the capacitor 25 was initially uncharged and the cathode of the silicon controlled rectifier 3 cannot go to zero potential instantly because the capacitor 20, the anode to cathode voltage of silicon controlled rectifier 3 is inverted. This turns off the silicon controlled rectifier 3. The diode 27 acts to restrain the voltage due to inductor 26 flyback.

The capacitor 28 in the circuit of the delay 29 begins to charge when the silicon controlled rectifier 6 fires. After a suitable interval, controlled by delay 29, the silicon controlled rectifier 8 fires, turning off the silicon controlled rectifier 6.

The time interval delay provided by delay 29 is long enough to allow capacitor 25, inductor 26 and resistor 24 to reach a steady state condition. After the silicon controlled rectifier 8 fires, capacitor 30 begins to charge. At the end of the time delay provided by delay 11, which is plenty of time for resistor 24 to restore the charge on capacitor 25 to zero so that full commutating energy is available, capacitor 30 reaches a voltage high enough to fire silicon controlled rectifier 3 again. Diode 33 allows the potential of the silicon controlled rectifier 3 to rise above the logic level, and prevents back flow of current into capacitor 30.

The protector shown in the drawings and above described may be complete and operative without employing the electromechanical circuit or back up breaker 2 and rely only on the silicon controlled rectifiers for overload protection.

However it may be more economic to design the silicon rectifier controlled circuit breaker for the usual fault, where the rate of rise of fault current is known within reason and add the electromechanical circuit breaker (buzzer) 2 to accommodate those faults that are most unusual or unexpected, but possible, and much more severe. The breaker 2 which is of the known type with automatic reset is set to trip at approximately three to ten times the anticipated fault current but before destruction. This will result in a more economic design in some cases.

Considerable variety of circuit arrangement may occur to those skilled in the art, but the central invention of the present application is in the sequencing and provision for convenient delay and firing of the appropriate silicon controlled rectifiers.

What is claimed is:

1. In an overload protector for electrical current supply, a load control silicon controlled rectifier, a load current sensing resistor connected in a circuit from the load control silicon controlled rectifier, a second silicon controlled rectifier connected in circuit with said load sensing resistor and said load control silicon controlled rectifier to turn off the load control silicon controlled rectifier upon energizing of the second silicon controlled rectifier, and a third or reset silicon controlled rectifier connected in circuit with the second or turn off silicon controlled rectifier to turn off the second or turn off silicon controlled rectifier and turn on the load control silicon controlled rectifier.

2. In an overload protector for electrical current supply, a load control silicon controlled rectifier, a load current sensing resistor connected in a circuit from the load control silicon controlled rectifier, a second silicon controlled rectifier connected in circuit with said load sensing resistor and said load control silicon controlled rectifier to turn off the load control silicon controlled rectifier upon energizing of the second silicon controlled rectifier, and a third or reset silicon controlled rectifier connected in circuit with the second or turn-off silicon controlled rectifier to turn off the second or turn-off silicon controlled rectifier and turn on the load control silicon controlled rectifier and an electromechanical backup circuit breaker connected in the circuit in series with said load control silicon controlled rectifier.

3. An overload protector for electrical current supply as claimed in claim 1, including a time delay device connected in circuit between said turn off silicon controlled rectifier and said reset silicon controlled rectifier, and a second time delay device connected in circuit between said reset silicon controlled rectifier and said load control silicon controlled rectifier.

4. In an overload protector for electrical current supply, a load control silicon controlled rectifier, a load current sensing resistor connected in a circuit from the load control silicon controlled rectifier, a second silicon controlled rectifier connected in circuit with said load sensing resistor and said load control silicon controlled rectifier to turn off the load control silicon controlled rectifier upon energizing of the second silicon controlled rectifier, and third or reset silicon controlled rectifier connected in circuit with the second or turn-off silicon controlled rectifier to turn off the second or turn-off silicon controlled rectifier and turn on the load control silicon controlled rectifier and means to sequence the operation of said silicon controlled rectifiers whereby upon a fault in the load current the load sensing resistor will energize the turn-off silicon controlled rectifier and turn off the load control silicon controlled rectifier, subsequently after a predetermined time delay energize the reset silicon controlled rectifier which will act to reset the turn-off silicon controlled rectifier and after a second predetermined time delay will act to turn on the load control silicon controlled rectifier.

5. An overload protector for electrical current supply, as claimed in claim 4, including an electromechanical backup circuit breaker connected in the circuit in series with said load control silicon controlled rectifier.

References Cited
UNITED STATES PATENTS

| | | | |
|---|---|---|---|
| 3,037,158 | 5/1962 | Schmidt | 317—33 |
| 3,155,879 | 11/1964 | Casey et al. | 317—22 |
| 3,198,989 | 8/1965 | Mahoney | 317—33 |
| 3,249,813 | 5/1966 | Price et al. | 317—33 |
| 3,255,384 | 6/1966 | Riebs | 317—22 |
| 3,281,638 | 10/1966 | Crawford | 317—33 |

MILTON O. HIRSHFIELD, *Primary Examiner.*

R. V. LUPO, *Assistant Examiner.*